US006451889B1

(12) United States Patent
Jang et al.

(10) Patent No.: US 6,451,889 B1
(45) Date of Patent: Sep. 17, 2002

(54) FLAMEPROOF THERMOPLASTIC RESIN COMPOSITION

(75) Inventors: Bok-nam Jang, Seoul; Se-jong Kim; Gyu-cheol Lee, both of Kyungki-do, all of (KR)

(73) Assignee: Cheil Industries, Inc., Kyungbuk (KR)

( * ) Notice: Subject to any disclaimer, the term of this patent is extended or adjusted under 35 U.S.C. 154(b) by 0 days.

(21) Appl. No.: 09/608,875

(22) Filed: Jun. 29, 2000

Related U.S. Application Data

(63) Continuation of application No. 09/106,215, filed on Jun. 29, 1998, now abandoned.

(30) Foreign Application Priority Data

Apr. 9, 1998 (KR) ............................................ 98-12220

(51) Int. Cl.[7] .............................................. C08K 5/523
(52) U.S. Cl. ...................... 524/127; 524/141; 524/145
(58) Field of Search ................................. 524/127, 141, 524/145; 525/92 D, 92 K, 134, 392, 502

(56) References Cited

U.S. PATENT DOCUMENTS

| | | | | |
|---|---|---|---|---|
| 4,360,618 A | | 11/1982 | Trementozzi | ............... 524/141 |
| 4,433,088 A | * | 2/1984 | Haaf et al. | .................. 524/151 |
| 4,578,423 A | | 3/1986 | Deets et al. | .................... 525/68 |
| 4,618,633 A | | 10/1986 | Taubitz et al. | ................ 524/80 |
| 4,632,946 A | * | 12/1986 | Muench et al. | ............. 524/100 |
| 4,835,201 A | | 5/1989 | Bopp | ........................ 524/102 |
| 4,866,126 A | | 9/1989 | Mylonakis et al. | ........... 525/68 |
| 4,966,814 A | | 10/1990 | Ohzeki | ....................... 428/457 |
| 5,100,959 A | | 3/1992 | Okada et al. | .................. 525/68 |
| 5,143,955 A | | 9/1992 | Kendall | ....................... 524/151 |
| 5,206,404 A | | 4/1993 | Gunkel et al. | |
| 5,290,836 A | * | 3/1994 | Truyen et al. | ............... 524/127 |
| 5,455,292 A | * | 10/1995 | Kakegawa et al. | ......... 524/141 |
| 5,605,962 A | * | 2/1997 | Suzuki et al. | .................. 524/70 |
| 5,621,029 A | | 4/1997 | Eckel et al. | |
| 5,643,981 A | | 7/1997 | Yang et al. | |
| 5,672,645 A | | 9/1997 | Eckel et al. | |
| 5,674,924 A | | 10/1997 | Lee et al. | ..................... 523/201 |
| 6,124,385 A | | 9/2000 | Honl et al. | .................. 524/115 |
| 6,140,399 A | | 10/2000 | Munro | ....................... 524/127 |

OTHER PUBLICATIONS

High Temperature Resistant Polymers—A.H. Frazer, ed., 11A–123 (1968)—John Wiley & Sons, 1968.*
The Chemistry and Uses of Fire Retardants—John W. Lyons, ed., 2–13, 416–423, 1970.*

* cited by examiner

*Primary Examiner*—Peter Szekely
(74) *Attorney, Agent, or Firm*—Maria Parrish Tungol

(57) ABSTRACT

A flameproof thermoplastic resin composition of the present invention comprises (A) 100 parts by weight of a rubber modified styrene-containing base resin composed of 20~100% by weight of a styrene-containing graft copolymer resin and 0~80% by weight of a styrene-containing copolymer resin; (B) 5~40 parts by weight of a phenolic resin; (C) 3~40 parts by weight of a PPE resin having a hindered phenolic structure; and (D) 5~30 parts by weight of an aromatic phosphoric acid ester having a hindered phenolic structure. Said flameproof thermoplastic resin composition may further comprise 0.01~2.0 parts by weight of a fluorine resin to 100 parts by weight of said rubber modified styrene-containing base resin.

23 Claims, No Drawings

FLAMEPROOF THERMOPLASTIC RESIN COMPOSITION

This application is a continuation of Ser. No. 09/106,215 filed on Jun. 29, 1998, now abandoned.

FIELD OF THE INVENTION

The present invention relates to a flameproof thermoplastic resin composition. More particularly, the present invention relates to a flameproof thermoplastic resin composition that comprises a rubber modified styrene-containing resin as a base resin, a phenolic resin, a polyphenylene ether resin having a hindered phenolic structure and an aromatic phosphoric acid ester having a hindered phenolic structure.

BACKGROUND OF THE INVENTION

A rubber modified styrene-containing resin has a good processability, a high impact strength, and a good appearance. Accordingly, the resin has been widely applied to electrical appliances and office supplies. In case that a rubber modified styrene-containing resin is applied to a personal computer, facsimile, or the like, that emits heat, a property of flame retardancy should be given in the resin due to a combustibility. A widely known method for the flame retardancy is that halogen-containing compounds or antimony-containing compounds are added to a rubber modified styrene-containing resin to give the property of flame retardancy. Halogen-containing compounds used in above method are, for example, polybromodiphenyl ether, tetrabromobisphenol A, epoxy compounds substituted by bromine, and chlorinated polyethylene. An antimony trioxide and an antimony pentoxide are widely used as antimony-containing compounds. The flame retardancy method by applying halogen and antimony has such advantages as easy acquirement of the property of flame retardancy and no degradation of the physical properties. However, the disadvantages could be observed that the halogen-containing compound results in the corrosion of the mold itself by the hydrogen halide gases released during a molding process and is fatally harmful due to the toxic gases liberated in the case of fire. Especially, since a polybromodiphenyl ether, mainly used for a halogen-containing flame-retardant, can produce the toxic gases such as dioxin or difuran during combustion, a flame retardant which is not prepared with halogen-containing compound becomes the main concern in this field.

U.S. Pat. Nos. 4,692,488 and 5,204,394 disclose a compound that an aromatic phosphoric acid ester compound is applied to a blend of polycarbonate and acrylonitrile-styrene-butadiene resin, and polytetrafluoroethylene is added therein, so that the property of UL94 V-0 is acquired. On the other hand, the acquirement of the properties of V-0 or V-1 is difficult when the contents of polycarbonate is less than 60 parts by weight, due to the flame retardant characteristic itself of an aromatic phosphoric acid ester.

In addition, Japanese Patent Laid-open No. 7-48,491 discloses a flameproof thermoplastic resin, made of adding novolacs as phenolics and a phosphoric acid ester into a thermoplastic copolymer resin composed of a rubber copolymer and an aromatic vinyl monomer. According to the present inventors' appraisal, it is difficult to obtain a practical heat resistance because the property of UL94 V-1 or V-0 is difficult to acquire, and heat resistance is suddenly dropped. The practical heat resistance means the heat resistance applied in an electric equipment. In case of a monitor housing of computer, it should be kept at least 85° C. under 5 kg according to ASTM D-1525.

Accordingly, the present inventors have developed a resin composition with the good properties of flame retardancy and heat resistance, which comprises a rubber modified styrene-containing resin, a phenolic resin, a PPE resin having a hindered phenol structure and an aromatic phosphoric acid ester having a hindered phenol structure, and also the resin composition may further comprise a fluorine resin.

OBJECTS OF THE INVENTION

An object of the present invention is to provide a thermoplastic resin composition which has a good property of flame-retardancy.

Another object of the present invention is to provide a flameproof thermoplastic resin composition which has a good characteristic of heat resistance.

A further object of the present invention is to provide a flameproof thermoplastic resin composition which does not contain a halogen-containing compound which causes the environmental pollution during the process or combustion of the resin.

Other objects and advantages of this invention will be apparent from the ensuing disclosure and appended claims.

SUMMARY OF THE INVENTION

A flameproof thermoplastic resin composition of the present invention comprises (A) 100 parts by weight of a rubber modified styrene-containing base resin composed of 20~100% by weight of a styrene-containing graft copolymer resin and 0~80% by weight of a styrene-containing copolymer resin; (B) 5~40 parts by weight of a phenolic resin; (C) 3~40 parts by weight of a PPE resin having a hindered phenolic structure; and (D) 5~30 parts by weight of an aromatic phosphoric acid ester having a hindered phenolic structure. The flameproof thermoplastic resin composition may further comprise 0.01~2.0 parts by weight of a fluorine resin to 100 parts by weight of rubber modified styrene-containing base resin.

DETAILED DESCRIPTION OF THE INVENTION

The flameproof thermoplastic resin compositions according to the present invention comprise (A) a rubber modified styrene-containing base resin composed of ($a_1$) a styrene-containing graft copolymer resin and ($a_2$) a styrene-containing copolymer resin, (B) a phenolic resin, (C) a PPE resin having a hindered phenolic structure and (D) an aromatic phosphoric acid ester having a hindered phenolic structure. The resin composition may further comprise (E) a fluorine resin.

Generally, when a rubber modified styrene-containing resin such as ABS is burned, a char is not produced due to a decomposition and a vaporization in most parts. Therefore, in case of not adding a halogen which imparts an effect of flame retardancy in gas phase, it is very difficult to obtain the property of flame-retardancy. Japanese Patent Laid-open No. 7-48491 discloses a flameproof composition which does not contain a halogen-containing compound, wherein a phenolic resin and a phosphoric acid ester was used as a flame-retardant. It was found that in order to obtain a good property of flame-retardancy, a phenolic resin and a phosphoric acid ester as a flame retardant should be added a lot. However, in this case, the heat resistance of the resin composition may be dropped suddenly.

In order to maintain heat resistance of more than 85° C., an appropriate amount of a phenolic resin and a phosphoric acid ester should be employed therein.

The present inventors have made it possible to make a flameproof resin composition by means of mixing and adding a phenolic resin, a polyphenylene ether resin having a hindered phenolic structure, and an aromatic phosphoric acid ester having a hindered phenolic structure to the rubber-modified styrene-containing resin. Therefore, a good property of flame-retardancy as well as a good improvement of heat resistance were obtained, and the resin composition has heat resistance of more than 85° C. and a physical property of more than UL94 V-1.

The detailed descriptions of components of the resin composition according to the present invention are as follows:

(A) Rubber modified Styrene-containing Base Resin

A rubber modified styrene-containing base resin means a styrene-containing graft copolymer resin such as ABS, and the graft copolymer resin may contain a styrene-containing copolymer resin such as SAN.

A rubber modified styrene-containing resin is that a rubber phase copolymer is dispersed and existed in the form of particles in a matrix, made of aromatic vinyl copolymers. The resin is prepared by adding an aromatic vinyl monomer and a vinyl-containing monomer, which can be polymerized therewith, in the presence of a rubber phase polymer. Such rubber-modified styrene-containing resin is prepared by a known method such as emulsion polymerization, suspension polymerization or bulk polymerization, and is conventionally produced by means of mixed extrusion with a styrene-containing graft copolymer resin and a styrene-containing copolymer resin. In bulk polymerization, a styrene-containing graft copolymer resin and a styrene-containing copolymer resin are not produced separately. One step process is employed to produce a rubber modified styrene-containing resin. In either case, the contents of the rubber in a final rubber modified styrene-containing resin to the total weight of the base resin prefer to be 5 to 30 parts by weight. Examples of such resins are acrylonitrile-butadiene-styrene (ABS) copolymer resin, acrylonitrile-acryl rubber-styrene (AAS) copolymer resin, acrylonitrile-ethylenepropylene rubber-styrene (AES) copolymer resin, and the like.

In the above-mentioned resins, it is possible to use a styrene-containing graft copolymer resin independently, or a styrene-containing graft copolymer resin in combination with a styrene-containing copolymer resin.

($a_1$) Styrene-containing Graft Copolymer Resin

Examples of a rubber used for a styrene-containing graft copolymer resin are a diene-containing rubber such as polybutadiene, poly(styrene-butadiene) and poly(acrylonitrile-butadiene); a saturated rubber which hydrogen is added to said diene-containing rubber; an isoprene rubber; a chloroprene rubber; a polyacrylic acid butyl; and a terpolymer of ethylene-propylene-diene. It is preferred to use a diene-containing rubber, more preferably butadiene-containing rubber. The contents of a rubber prefer to be 10 to 60 parts by weight to the total weight of a graft copolymer resin.

Aromatic vinyl-containing monomers in a mixture of monomers for the graft polymerization are styrene, α-methylstyrene, p-methylstyrene, etc. In the above examples, styrene is most preferable, and more than one monomers which can be copolymerized are introduced and applied to said aromatic vinyl monomers. It is preferred that said monomers, which can be copolymerized, are a cyanide vinyl-containing compound such as acrylonitrile and a unsaturated nitrile-containing compound such as methacrylonitrile.

The rubber content of the styrene-containing graft copolymer is 10 to 60% by weight, the aromatic vinyl-containing monomer content is 30 to 70% by weight, and the unsaturated nitrile-containing monomer content is 10 to 30% by weight. In addition, in order to give characteristics of processability and heat resistance, acrylic acid, methacryl acid, anhydrous maleinic acid and N-sustituted maleimide can be added in the graft polymerization. The amounts of additives are in the range of 0 to 20 parts by weight based on the total of said styrene-containing graft copolymer resins.

To acquire good properties of a compact strength and an appearance when said styrene-containing graft copolymer is prepared, the average size of rubber particles is preferred to be in the range of 0.1 to 4 μm.

($a_2$) Styrene-containing Copolymer Resin

The components of the styrene-containing copolymer resin are as follows:

Examples of aromatic vinyl-containing monomers, which are copolymerized, are styrene, α-methylstyrene, p-methylstyrene, etc., and styrene is the most preferable. The aromatic vinyl-containing monomer in the components of the total copolymer resin is 60 to 95 parts by weight. Here, more than one monomer can be applied to said aromatic vinyl-containing monomer. It is preferred that monomers which can be introduced are cyanide vinyl-containing compounds such as acrylonitrile and unsaturated nitrile-containing compounds such as methacrylonitrile. It is also preferred that 5 to 40 parts by weight of these monomers to the total copolymer is introduced therein. In addition, 0 to 40 parts by weight of monomer such as acrylic acid, methacrylic acid, anhydrous maleinic acid and N-sustituted maleimide can be added and copolymerized thereto.

A rubber modified styrene-containing base resin (A) comprises 20 to 100% by weight of styrene-containing graft copolymer resin ($a_1$) and 0 to 80% by weight of styrene-containing copolymer resin ($a_2$).

(B) Phenolic Resin

Phenolic resins are classified in novolacs and resoles, which are all used in the present invention. The phenolic resins are also classified in thermosetting and thermoplastic resins, which are all used in the present invention. It is preferred that phenolic resins used in the present invention have a hindered phenol structure. The novolacs are more preferable than resoles in the present invention.

Novolacs are, for example, phenol-formaldehyde resins, tertiary butylphenol formaldehyde resins, paraoctylphenol formaldehyde resins, paracyanophenol formaldehyde resins and the like, and also a copolymer of said resins can be used. The suitable average molecular weight of novolacs is in the range of 300 to 10,000.

The phenolic resins are applied in the amount of 5 to 40% by weight on the basis of 100 parts by weight of a rubber-modified styrene-containing resin. If the amount of the phenolic resin is less than 5 parts by weight, the resin composition has a poor flame retardancy. On the other hand, if the amount of the phenolic resin is more than 40 parts by weight, the resin composition has a decrease of mechanical property and heating property.

(C) Polyphenylene Ether(PPE) Resin Having a Hindered Phenolic Structure

Polyphenylene ether resin having a hindered phenolic structure is applied as a monomer, for example, poly(2,6-dimethyl-1-4-phenylene) ether, poly(2,6-diethyl-1,4-phenylene) ether, poly(2,6-dipropyl-1,4-phenylene) ether, poly(2-methyl-6-ethyl-1,4-phenylene) ether. poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-pheylene) ether and poly(2,3,5-triethyl-1,4-phenylene) ether. Preferably, copolymer of poly (2,6-dimethyl-1,4-phenylene) ether and poly(2,3,6-trimethyl-1,4-phenylene) ether, and poly(2,6-dimethyl-1,4-phenylene) ether is used, more preferably poly(2,6-dimethyl-1,4-phenylene). The polymerization degree of polyphenylene ether is not defined specifically, but it is preferred that the viscosity of polypheylene ether is in the range of 0.2 to 0.8 measured in chloroform solvent at 25° C. It is possible to use one or a mixture of these polyphenylene ethers with an appropriate ratio.

The polyphenylene ether-containing resin can be used in the amount of 3 to 40 parts by weight to the rubber modified styrene-containing resin, more preferably 5 to 20 parts by weight.

(D) Aromatic Phosphoric Acid Ester having a Hindered Phenolic Structure

Phosphoric acid esters which can be used in the present invention is a compound having a structural formula (I), for example, tri(2,6-dimethyl phenyl) phosphate, tri(2,6-ditertiary butyl phenyl) phosphate, etc:

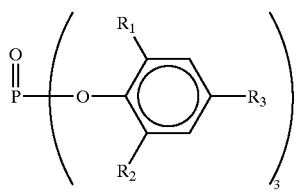

wherein $R_1$ and $R_2$ are $C_1$–$C_6$ alkyl or phenyl group, and $R_3$ is hydrogen, or $C_1$–$C_6$ alkyl or phenyl group.

In the present invention, a phosphoric acid ester compound having the structural formula (II) can be used:

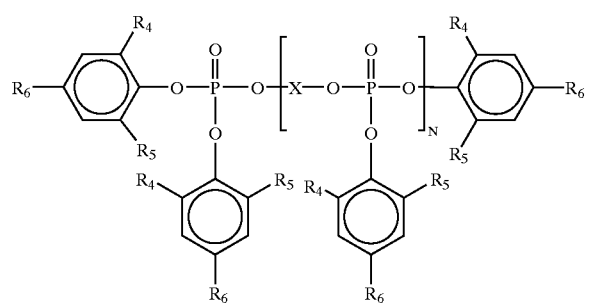

wherein $R_4$ and $R_5$ are $C_1$–$C_6$ alkyl or phenyl group, and $R_6$ is H or $C_1$–$C_6$ alkyl or phenyl group, and X is $C_6$–$C_{20}$ aryl or alkylaryl group, and N is not less than 1.

Examples of compounds having the structural formula (II) are, resorcinolbis(di(2,6-dimethyl phenyl)phosphate). hydroquinonebis(di(2,6-dimethylphenyl)phosphate), biphenylbis(di(2,6-dimethyl phenyl)phosphate), resorcinolbis(di(2,6-ditertiary butyl phenyl)phosphate), and the like.

In addition, in the present invention, phosphoric acid ester compound having the structural formula (III) with a frame of phloroglucinol can be used:

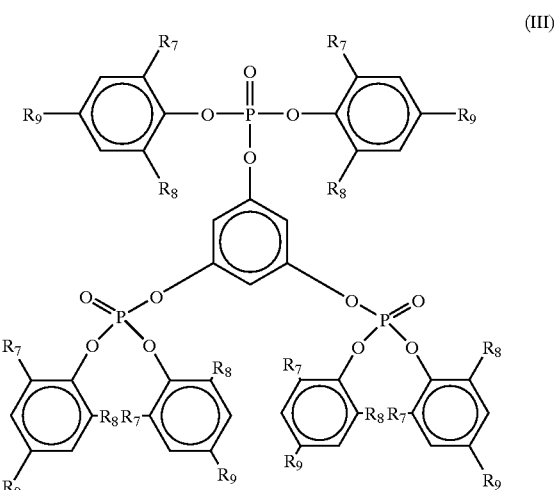

wherein $R_7$ and $R_8$ is $C_1$–$C_6$ phenyl group, and $R_9$ is H or $C_1$–$C_6$ alkyl or phenyl group.

Examples of compounds having the structural formula (III) are 1,3,5-tri(2,6-dimethyl phenyl phosphate) fluoroglucinol, 1,3,5-tri(2,6-ditertiary butyl phenyl phosphate) fluoroglucinol, and the like.

It is possible to use one or a mixture of phosphoric acid esters having the above structural formula, but it is not preferred to apply a compound having the molecular weight of more than 1500, due to a small effect of a flame-retardancy. Phosphoric acid ester having a melting point of 80° C. is preferable to be applied.

In the present invention, the amount of a hindered phenol-containing aromatic phosphoric acid ester compound used as a flame retardant is 5 to 30 parts by weight to 100% by weight of the base resin of the present invention, more preferably 10 to 25 parts by weight.

(E) Fluorine Resin

Fluorine resins are, for example, polytetrafluoroethylene, polyvinyleidenfluorite, copolymer of tetrafluoroethylene and fluoroalkylvinyl ether, and copolymer of tetrafluoroethylene and hexafluoropropylene. They can be used in one another independantly, or a blend of more than two thereof. The fluorine resins decrease the melting flow and increase the shrinkage of the resin during combustion by forming a fibrillar network in the resin, thereby preventing the dripping of the resin. If fluorine-containing resin in the phase of emulsion is used, there is a advantage of having a good dispersion in the resin. On the other hand, there is a disadvantage of making process intricated. Accordingly, the fluorine resins may preferably be used in a form of powder so as to appropriately disperse in the resin to form a fibrillar network. The preferable fluorine-containing resin is polytetrafluoroethylene. The amount of the fluorine resin used in the present invention is 0.01 to 2.0 parts by weight to 100 parts by weight of the base resin.

Plasticizer, heat stabilizer, oxidation inhibitor and light stabilizer can be added to said composition. An inorganic filler such as talc, silica, mica, glass fiber, an organic or inorganic pigment and dye can be added therein.

The characteristics of the present invention are that the compositions prevent toxic gases during process and combustion, and show the flame retardancy of UL94 V0 or V1, and a good heat resistance. The flameproof thermoplastic resin composition which has good properties of flame-retardancy and heat resistance was prepared by adding phenolic resin, polyphenylene ether-containing resin having a hindered phenol structure and phosphoric acid ester having a hindered phenol structure to said rubber modified styrene-containing copolymer resin.

The invention may be better understood by reference to the following examples which are intended for the purpose of illustration and are not to be construed as in any way limiting the scope of the present invention, which is defined in the claims appended hereto.

EXAMPLES

The components to prepare flameproof thermoplastic resin compositions in Examples 1–2 and Comparative Examples 1–6 are as follows:

(A) Base Resin ($a_1$) Styrene-containing Graft Copolymer Resin

Styrene-containing graft copolymer resin(G-ABS) powder was prepared by blending 50 parts by weight of butadiene rubber latex powder, 36 parts by weight of monomer (such as styrene) for grafting 14 parts by weight of acrylonitrile and 150 parts by weight of deionized water; and introducing 1.0 parts by weight of oleic phosphoric acid potassium, 0.4 parts by weight of cumenhydroperoxide, 0.2 parts by weight of mercaptan-containing chain transfer agent, 0.4 parts by weight of glucose, 0.01 parts by weight of ferrous sulfate hydrate, and 0.3 parts by weight of pyrophosphate sodium salt; and keeping it at 75° C. for 5 hours, thereafter ABS latex was prepared, and 0.4 parts by weight of sulfuric acid to the solid powder was introduced to the solid powder of resin, and coagulated.

($a_2$) Copolymer Resin

A copolymer resin(SAN) was prepared by blending 75 parts by weight of styrene, 25 parts of acrylonitrile, 120 parts by weight of deionized water and 0.2 parts by weight of azobisisobutylonitrile; and adding 0.4 parts by weight of tricalciumphosphate and 0.2 parts by weight of mercaptan-containing chain transfer agent; and the solution was heated up to 80° C. for 90 minutes, and keeping it for 180 minutes. The copolymer resin was prepared by washing, dehydrating and drying the resultant.

(B) Phenolic Resin

Phenolic resin, novolacs, of PSM 4324 Grade of Japan Gunei Co. was used herein.

(C) Polyphenylene Ether Having a Hindered Phenol Structure

Poly(2,6-dimethyl-1,4-phenyl) ether of Japan Asai Kasei Co. was used, and the product name of powder form was P-401.

($D_1$) Having Hindered Phenolic Structure Phosphoric Acid Ester Compound

Tri(2,6-dimethylphenyl) phosphate(PX-130) of Japan Daihachi Co. was used.

($D_2$) Triphenylphosphate

Triphenylphosphate(TPP) of Japan Daihachi Co. was used.

(E) Fluorine-containing Resin

Teflon 7AJ of Japan Mitsui Dupont Co. was used.

The test results of compositions and physical properties of Examples 1–2 and Comparative Examples 1–6 were shown in Table 1.

TABLE 1

| | Example | | Comparative Example | | | | | |
|---|---|---|---|---|---|---|---|---|
| | 1 | 2 | 1 | 2 | 3 | 4 | 5 | 6 |
| Graft copolymer resin ($A_1$) | 40 | 40 | 40 | 40 | 40 | 40 | 40 | 40 |
| Copolymer resin ($A_2$) | 60 | 60 | 60 | 60 | 60 | 60 | 60 | 60 |
| Phenolic resin (B) | 10 | 10 | — | 10 | 10 | — | — | 20 |
| Polyphenylene ether (C) | 10 | 20 | — | — | — | 10 | 10 | — |
| Hindered phenolic phosphoric acid ester ($D_1$) | 18 | 18 | — | — | 18 | — | 18 | — |
| Triphenyl phosphate ($D_2$) | — | — | 18 | 18 | — | 18 | — | 18 |
| Vicat softening temperature$^\alpha$ | 87 | 89 | 57 | 57 | 86 | 58 | 91 | 52 |
| UL 94 (1/10")$^\beta$ | V-1 | V-0 | Fail | Fail | Fail | Fail | Fail | Fail |
| 1st 10 sec after ignition | 12 | 5 | p. c. | 19 | 22 | p. c. | p. c. | 13 |
| 2nd 10 sec after ignition | 17 | 4 | — | 45 | 48 | — | — | 33 |

Notes)
Vicat softening temperature$^\alpha$: the results were measured according to ASTM D-1525 under 5 kg.
Flame retardancy: UL 94(1/10")$^\beta$ was measured according to UL94 VB.
p. c.: perfect combustion The components to prepare a flameproof thermoplastic resin composition in Examples 3–4 and Comparative Examples 7–12 are as follows, and the test results of each component and the physical properties of Examples 3–4 and Comparative Examples 7–12 are shown in Table 2:

TABLE 2

| | Example | | Comparative Example | | | | | |
|---|---|---|---|---|---|---|---|---|
| | 3 | 4 | 7 | 8 | 9 | 10 | 11 | 12 |
| Graft copolymer resin ($A_1$) | 40 | 40 | 40 | 40 | 40 | 40 | 40 | 40 |
| Copolymer resin ($A_2$) | 60 | 60 | 60 | 60 | 60 | 60 | 60 | 60 |
| Phenolic resin (B) | 10 | 20 | 20 | — | — | 10 | 10 | 20 |
| Polyphenylene ether (C) | 10 | 10 | — | 20 | 20 | 10 | — | — |
| Hindered phenolic phosphoric acid ester ($D_1$) | 18 | 18 | 18 | 18 | — | — | — | — |
| Triphenyl phosphate ($D_2$) | — | — | — | — | 18 | — | 18 | 18 | 18 |
| Fluorine resin | 0.2 | 0.2 | — | — | — | — | 0.2 | 0.2 |
| Vicat softening temperature$^\alpha$ | 88 | 89 | 83 | 61 | 92 | 56 | 58 | 55 |
| UL 94 (1/10")$^\beta$ | V-1 5V | V-0 5V | Fail | Fail | Fail | Fail | Fail | Fail |
| 1st 10 sec after ignition | 12 | 4 | 18 | p. c. | p. c. | 7 | 19 | 12 |
| 2nd 10 sec after ignition | 14 | 6 | 31 | — | — | 37 | 43 | 35 |

Notes)
Vicat softening temperature$^\alpha$: the results were measured according to ASTM D-1525 under 5 kg.
Flame retardancy: UL 94(1/10")$^\beta$ was measured according to UL94 VB.
p. c.: perfect combustion Examples 1–4 and Comparative Examples 1–12 were carried out with a base resin composed of graft copolymer resin and copolymer resin in the ratio of 40/60, and by changing the contents of phenolic resin, polyphenylene ether, hindered phenolic phosphoric acid ester, triphenylphosphate and fluorine resin. The results were shown in Tables 1 & 2. Less than 1 parts by weight of hindered phenol-containing antioxidant or phosphite-containing antioxidant as a stabilizer was added, and then the resultant was processed in twin-screw extruder in the temperature range of 200 to 290° C., thereafter, the physical properties were measured.

As shown in Table 1 and Table 2, in Examples 1–4 the heat. resistance was over 87° C. and the properties of flame retardancy were V-1 or V-0. But, in Comparative Examples 1, 2, 4, 6, 8, 11 & 12, the heat resistance could not reach up to 85° C., and also the property of flame retardancy could not acquire the level of UL94. In case of applying a hindered phenolic phosphoric acid ester, the heat resistance could be kept as the results of Comparative Example 3, 5 & 9, but in case of excepting one of phenolic resin and polyphenylene ether, it was difficult to obtain a good property of flame-retardant.

In the present invention, it was shown that in order to obtain UL 94 of the property of flame retardancy, phenolic resin, polyphenylene ether resin and hindered phenolic phosphoric acid ester should be added to the rubber modified styrene-containing resin, and in order to keep the appropriate heat resistance, phosphoric acid ester having a hindered phenolic structure instead of phosphoric acid ester should be added thereto.

As shown in Example 1 and Comparative Examples 2 & 3, polyphenylene ether resin was not applied to the resin composition in Comparative Examples, which shows a self-extinguishing, but UL 94 VB was not satisfied. In addition, in Comparative Examples 6 & 7, the property of flame retardancy was improved by adding 20 parts by weight of phenolic resin, and UL94 VB was not shown.

In addition, in Comparative Examples 4, 5, 8 & 9, phenolic resin was not added, therefore, (he effect of flame retardancy was not shown.

In Examples 3 & 4, a fluorine resin was further added to the components of Examples 1 & 2, therefore, it was shown that the property of flame-retardancy of 5V for the thickness of 1/10" was able to be obtained.

The present invention can be easily carried out by an ordinary skilled person in the art. Many modifications and changes may be deemed to be with the scope of the present invention as defined in the following claims.

What is claimed is:

1. A flameproof thermoplastic resin composition comprising:
   (A) 100 parts by weight of a rubber modified styrene-containing base resin composed of ($a_1$) 20 to 100% by weight of a styrene-containing graft copolymer resin, and ($a_2$) 0 to 80% by weight of a styrene-containing copolymer resin;
   (B) 5 to 40 parts by weight of a phenolic resin;
   (C) 3 to 40 parts by weight of a polyphenylene ether resin having a hindered phenol structure; and
   (D) 5 to 30 parts by weight of an aromatic phosphoric acid ester having a hindered phenol structure.

2. The flameproof thermoplastic resin composition as defined in claim 1 wherein said phenolic resin has a hindered phenol structure.

3. The flameproof thermoplastic resin composition as defined in claim 1 wherein said phenolic resin is novolac.

4. The flameproof thermoplastic resin composition as defined in claim 1 wherein said polyphenylene ether resin is selected from the group consisting of poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, poly(2,6-dimethyl-1,4-phenylene) ether, and copolymer of poly(2,6-dimethyl-1,4-phenylene) ether and poly(2,3,5-trimethyl-1,4-phenylene) ether.

5. The flameproof thermoplastic resin composition as defined in claim 1 wherein said aromatic phosphoric acid ester is selected from the group consisting of formula(I), (II) and (III):

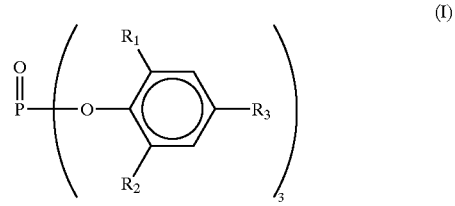

wherein $R_1$ and $R_2$ are $C_1$–$C_6$ alkyl or phenyl group, and $R_3$ is hydrogen, or $C_1$–$C_6$ alkyl or phenyl group;

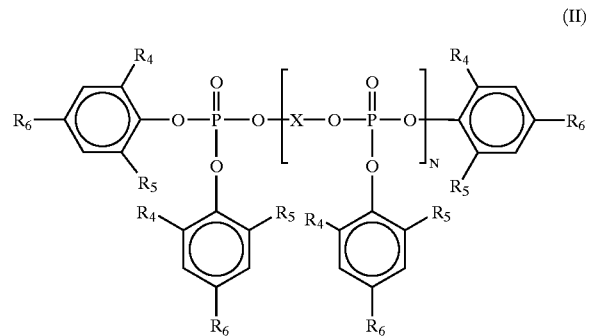

wherein $R_4$ and $R_5$ are $C_1$–$C_6$ alkyl or phenyl group, and $R_6$ is H Or $C_1$–$C_6$ alkyl or phenyl group, and X is $C_6$–$C_{20}$ aryl or alkylaryl group, and N is not less than 1;

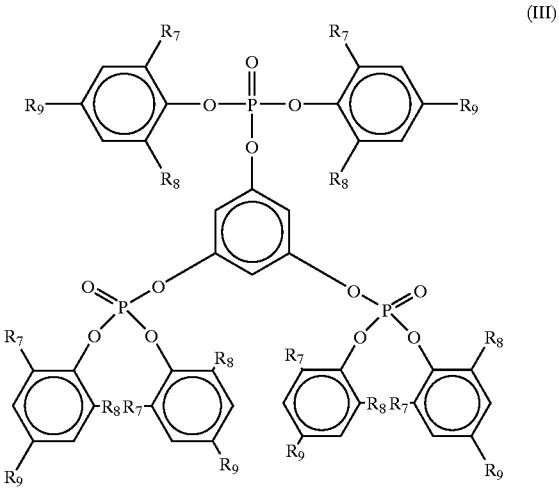

wherein $R_7$ and $R_8$ are $C_1$–$C_6$ alkyl or phenyl group, and $R_9$ is H or $C_1$–$C_6$ alkyl or phenyl group.

6. The flameproof thermoplastic resin composition as defined in claim 1 wherein said resin composition further comprises 0.01 to 2.0 parts by weight of a fluorine resin which is selected from the group consisting of poly (tetrafluoroethylene), polyvinylidenefluoride, copolymer of tetrafluoroethylene and fluoroalkylvinylether, and copolymer of tetrafluoroethylene and hexafluoropropylene.

7. The flameproof thermoplastic resin composition as defined in claim 1 wherein said resin composition further comprises plasticizer, compatibilizer, heat stabilizer, oxidation inhibitor, light stabilizer, pigments, dyes or inorganic filler or mixtures thereof.

8. The flameproof thermoplastic resin composition according to claim 2 wherein said resin composition further comprises 0.01 to 2.0 parts by weight of a fluorine resin selected from the group consisting of poly(tetrafluoroethylene), polyvinylidenefluoride, copolymer of tetrafluoroethylene and fluoroalkylvinylether, and copolymer of tetrafluoroethylene and hexafluoropropylene.

9. The flameproof thermoplastic resin composition according to claim 2 wherein said resin composition further comprises plasticizer, compatibilizer, heat stabilizer, oxidation inhibitor, light stabilizer, pigments, dyes, or inorganic filler or mixtures thereof.

10. The flameproof thermoplastic resin composition according to claim 3 wherein said resin composition further comprises 0.01 to 2.0 parts by weight of a fluorine resin selected from the group consisting of poly(tetrafluoroethylene), polyvinylidenefluoride, copolymer of tetrafluoroethylene and fluoroalkylvinylether, and copolymer of tetrafluoroethylene and hexafluoropropylene.

11. The flameproof thermoplastic resin composition according to claim 3 wherein said resin composition further comprises plasticizer, compatibilizer, heat stabilizer, oxidation inhibitor, light stabilizer, pigments, dyes, or inorganic filler or mixtures thereof.

12. The flameproof thermoplastic resin composition according to claim 4 wherein said resin composition further comprises 0.01 to 2.0 parts by weight of a fluorine resin selected from the group consisting of poly(tetrafluoroethylene), polyvinylidenefluoride, copolymer of tetrafluoroethylene and fluoroalkylvinylether, and copolymer of tetrafluoroethylene and hexafluoropropylene.

13. The flameproof thermoplastic resin composition according to claim 4 wherein said resin composition further comprises plasticizer, compatibilizer, heat stabilizer, oxidation inhibitor, light stabilizer, pigments, dyes, or inorganic filler or mixtures thereof.

14. The flameproof thermoplastic resin composition according to claim 5 wherein said resin composition further comprises 0.01 to 2.0 parts by weight of a fluorine resin selected from the group consisting of poly(tetrafluoroethylene), polyvinylidenefluoride, copolymer of tetrafluoroethylene and fluoroalkylvinylether, and copolymer of tetrafluoroethylene and hexafluoropropylene.

15. The flameproof thermoplastic resin composition according to claim 5 wherein said resin composition further comprises plasticizer, compatibilizer, heat stabilizer, oxidation inhibitor, light stabilizer, pigments, dyes, or inorganic filler or mixtures thereof.

16. The flameproof thermoplastic resin composition according to claim 6 wherein said resin composition further comprises plasticizer, compatibilizer, heat stabilizer, oxidation inhibitor, light stabilizer, pigments, dyes, or inorganic filler or mixtures thereof.

17. A flameproof thermoplastic resin composition comprising:
(A) 100 parts by weight of a rubber modified styrene-containing base resin composed of ($a_1$) 20 to 100% by weight of a styrene-containing graft copolymer resin, and ($a_2$) 0 to 80% by weight of a styrene-containing copolymer resin;
(B) 5 to 40 parts by weight of a phenolic resin;
(C) 3 to 40 parts by weight of a polyphenylene ether resin having a hindered phenolic structure; and
(D) 5 to 30 parts by weight of an aromatic phosphoric acid ester having a hindered phenolic structure according to the following formula:

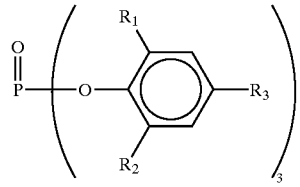

wherein $R_1$ and $R_2$ are $C_1$–$C_6$ alkyl or phenyl groups, and $R_3$ is hydrogen, or $C_1$–$C_6$ alkyl or a phenyl group.

18. The flameproof composition according to claim 17 wherein the aromatic phosphoric acid ester is tri(2,6-dimethyl phenyl) phosphate.

19. The flameproof composition according to claim 5 wherein the aromatic phosphoric acid ester is selected from the group consisting of tri(2,6-dimethyl phenyl) phosphate, tri(2,6-ditertiary butyl phenyl) phosphate, resorcinol bis(di(2,6-dimethyl phenyl)phosphate), hydroquinone bis(di(2,6-dimethylphenyl)phosphate), biphenyl bis(di(2,6-dimethyl phenyl)phosphate) and resorcinol bis(di(2,6-ditertiary butyl phenyl)phosphate).

20. The flameproof composition according to claim 5 where in the aromatic phosphoric acid ester is selected from the group consisting of 1,3,5-tri(2,6-dimethyl phenyl phosphate) fluoroglucinol and 1,3,5-tri(2,6-ditertiary butyl phenyl phosphate) fluoroglucinol.

21. The flameproof thermoplastic resin composition as defined in claim 19 wherein said polyphenylene ether resin is selected from the group consisting of poly(2,6-dimethyl-1,4-phenylene) ether, poly(2,6-diethyl-1,4-phenylene) ether, poly (2,6-dipropyl-1,4-phenylene) ether, poly(2-methyl-6-ethyl-1,4-phenylene) ether, poly (2-methyl-6-propyl-1,4-phenylene) ether, poly (2-ethyl-6-propyl-1,4-phenylene) ether, poly (2,6-diphenyl-1,4-phenylene) ether, poly(2,6-dimethyl-1,4-phenylene) ether, and copolymer of poly (2,6-dimethyl-1,4-phenylene) ether and poly (2,3,5-trimethyl-1,4-phenylene) ether.

22. The flameproof thermoplastic resin composition according to claim 21 wherein said resin composition further comprises 0.01 to 2.0 parts by weight of a fluorine resin selected from the group consisting of poly(tetrafluoroethylene), polyvinylidenefluoride, copolymer of tetrafluoroethylene and fluoroalkylvinylether, and copolymer of tetrafluoroethylene and hexafluoropropylene.

23. The flameproof thermoplastic resin composition as defined in claim 17 wherein said polyphenylene ether resin is selected from the group consisting of poly(2,6-dimethyl-1,4-phenylene) ether, poly(2,6-diethyl-1,4-phenylene) ether, poly (2,6-dipropyl-1,4-phenylene) ether, poly(2-methyl-6-ethyl-1,4-phenylene) ether, poly (2-methyl-6-propyl-1,4-phenylene) ether, poly (2-ethyl-6-propyl-1,4-phenylene) ether, poly (2,6-diphenyl-1,4-phenylene) ether, poly(2,6-dimethyl-1,4-phenylene) ether, and copolymer of poly (2,6-dimethyl-1,4-phenylene) ether and poly (2,3,5-trimethyl-1,4-phenylene) ether.

* * * * *